(12) United States Patent
Beraud et al.

(10) Patent No.: US 8,438,825 B2
(45) Date of Patent: May 14, 2013

(54) HEAD FOR THE APPLICATION OF REINFORCING THREADS ON A DEPOSITION SURFACE

(75) Inventors: Jean-Marc Beraud, Rives (FR); Jacques Ducarre, La Tour du Pin (FR); Jean-Benoit Thiel, La chapelie de la Tour (FR)

(73) Assignee: Hexcel Reinforcements, Z.I. La Plaine (FR)

( * ) Notice: Subject to any disclaimer, the term of this patent is extended or adjusted under 35 U.S.C. 154(b) by 0 days.

(21) Appl. No.: 13/139,460

(22) PCT Filed: Dec. 18, 2009

(86) PCT No.: PCT/FR2009/052623
§ 371 (c)(1),
(2), (4) Date: Sep. 6, 2011

(87) PCT Pub. No.: WO2010/070245
PCT Pub. Date: Jun. 24, 2010

(65) Prior Publication Data
US 2011/0309543 A1    Dec. 22, 2011

(30) Foreign Application Priority Data
Dec. 19, 2008   (FR) .................................. 08 58875

(51) Int. Cl.
*D01G 1/04* (2006.01)

(52) U.S. Cl.
USPC ..................................................... 57/2; 19/0.6

(58) Field of Classification Search ........ 57/2; 156/353, 156/354
See application file for complete search history.

(56) References Cited

U.S. PATENT DOCUMENTS

| | | | | |
|---|---|---|---|---|
| 4,328,061 A | * | 5/1982 | Off et al. | 156/353 |
| 4,569,716 A | * | 2/1986 | Pugh | 156/510 |
| 5,110,395 A | | 5/1992 | Vaniglia | |
| 2010/0230043 A1 | * | 9/2010 | Kisch | 156/265 |

FOREIGN PATENT DOCUMENTS

| | | |
|---|---|---|
| EP | 0167377 A2 | 1/1986 |
| EP | 0225563 A2 | 6/1987 |
| EP | 0626252 A1 | 11/1994 |
| EP | 1775108 A1 | 4/2007 |
| FR | 2656826 A1 | 7/1991 |
| FR | 2913366 A1 | 9/2008 |
| WO | 2006/092514 A2 | 9/2006 |
| WO | 2008/154269 A2 | 12/2008 |

\* cited by examiner

*Primary Examiner* — Shaun R Hurley
(74) *Attorney, Agent, or Firm* — W. Mark Bielawski; David J. Oldenkamp

(57) ABSTRACT

An applicator head for cutting yarn into segments of yarn and depositing the segments of yarn on a deposition surface. The applicator head includes a single mechanism that moves the yarn towards said deposition surface and also cuts the yarn into segments.

14 Claims, 2 Drawing Sheets

HEAD FOR THE APPLICATION OF REINFORCING THREADS ON A DEPOSITION SURFACE

The invention concerns the general technical field of machines or devices designed for the general deposition of reinforcement yarns to ensure the fabrication of composite materials parts.

The invention concerns more particularly an applicator head that is part of a machine for the application or placement of reinforcement yarns on a deposition surface.

The object of the invention concerns a head adapted to ensure the deposition of various types of reinforcement yarns, including for example, yarn bundles or strands, yarn rovings, fibers, composed of various materials, such as carbon, glass, polyester, aramid, etc., these reinforcement yarns being dry or pre-impregnated with a bonding agent or binder.

The object of the invention is particularly but not exclusively advantageous in the aviation, aerospace or automotive fields.

Prior art has suggested various types of application machines implementing a head for the placement of reinforcement yarns. For example, patent application WO 2006/092514 describes an applicator head for placing a layer of reinforcement yarns, containing for each reinforcement yarn, an individual cutting system and a system of individual redirection of the reinforcement yarn to a flexible applicator roller. The reinforcement yarns are guided from their storage area to the flexible applicator roller by guidance systems. Each individual cutting system includes a cutting blade mounted at the end of a pneumatic cylinder rod mounted opposite to a counter-tool or anvil. The pneumatic cylinder can move the cutting blade from a rest position in which the blade is separated from the reinforcement yarn to an active position in which the cutting blade butts against the anvil to cut the reinforcement yarn.

Each individual redirection system includes a feeding roller mounted opposite a counter-roller at the end of a pneumatic cylinder rod. The pneumatic cylinder can move the counter-roller between a rest position in which the counter-roller is separated from the reinforcement yarn, to an active position in which the counter-roller clamps the reinforcement yarn against the roller to advance the reinforcement yarn up to the flexible applicator roller.

For reasons of space, the individual redirection systems and the individual cutting systems are staggered in superimposed rows Despite the staggered installation of the individual cutting and redirection systems, the applicator head is bulky, prohibiting its use for the deposition of reinforcement yarns on a surface with a complex geometry, such as multiple bends or a concave profile with a small radius of curvature. In addition, the design of this applicator head carries a significant manufacturing cost.

Similarly, patent application WO 2008/154269 describes an applicator head for placing reinforcement yarns on a deposition surface that includes a redirection system of the cut reinforcement yarns into a system manipulating the reinforcement yarns.

The redirection system consists of a drum rotated in one direction and a counter-drum defining, with the drum, a pass-through slot for the reinforcement yarns. The drum is equipped with two cutting systems mounted diametrically opposed to the periphery of the drum and capable of being operated radially as they move in front of a fixed cam to cut the reinforcement yarns. Upstream of each cutting system, the drum comprises on a limited angular range, a driver zone engaged with the counter-drum to move the reinforcement yarns to the manipulating system. Upstream of the driver zone, the drum comprises a release zone for free motion of the reinforcement yarns.

This applicator head has the disadvantage that it does not allow the adjustment at will of the cutting, feeding, and free transfer of the reinforcement yarns, due to the successive placement of the corresponding zones at the periphery of the drum. Such a placement requires the use of a large diameter drum, resulting in an equally bulky applicator head.

The invention thus aims to overcome the disadvantages of the prior art by proposing a new applicator head for reinforcement yarns, designed to be compact, simple, and inexpensive.

To achieve these objectives, the invention concerns an applicator head for placing reinforcement yarns on a deposition surface, said head comprising:

a cutting mechanism for reinforcement yarns upstream of an application zone, including at least one cutting unit and one driving unit for moving the cutter, first along a forward stroke to allow the cutting of the reinforcement yarns, and secondly along a return stroke to allow the release of the cutter from the reinforcement yarns, and a redirection system for the reinforcement yarns after cutting, at least up to the application zone. According to the invention, the cutting mechanism powers the redirection system, said system being designed, first to not feed the reinforcement yarns during the forward stroke of the cutter and secondly, to feed the reinforcement yarns at least up to the application zone during the return stroke of the cutter. The joint powering of the cutting mechanism and of the redirection system limits the cost and the bulk of the applicator head.

The applicator head according to the invention further includes at least one of the following characteristics:

the redirection system comprises at least one drum rotated by the power unit, with the drum ensuring the direct or indirect feed of the reinforcement yarns on the return stroke;

the redirection system comprises a mechanism for tightening the reinforcement yarns against the drum;

the clamping mechanism comprises a counter-drum mounted opposite the drum, such that the reinforcement yarns pass between the drum and the counter-drum, the motion of the counter-drum being controlled by a separation/reconnection system with the drum so as to either space the counter-drum before the forward rotation of the drum in order to free the reinforcement yarns, or to reconnect before the return rotation of the drum in order for a friction feed of the reinforcement yarns by the drum during its rotation;

the separation/reconnection system comprises a pivoting lever with a controlled motion and equipped with the counter-drum;

the motion of the pivoting lever is controlled by a motor;

the cutting mechanism comprises an anvil on which the cutting unit assures the cutting of the reinforcement yarns;

a guiding device up to the application area, for at least one reinforcement yarn fed from a storage device;

the reinforcement yarn guiding device comprises between the cutting mechanism and the application zone, a truncated cone conduit for guiding the reinforcement yarns, widening from the application zone toward the cutting mechanism;

the guiding device for the reinforcement yarns comprises a guide located between the cutting mechanism and the feeding drum;

the guiding device for the reinforcement yarns comprises, upstream of the feed drum, a guide block which houses an individual guide path for each reinforcement yarn;

an applicator roller mounted to rotate freely in the application zone of the reinforcement yarns.

Various other characteristics emerge from the description below in reference to the appended drawings which show as non-limiting examples the fabrication forms of the object of the invention.

Figure 1:
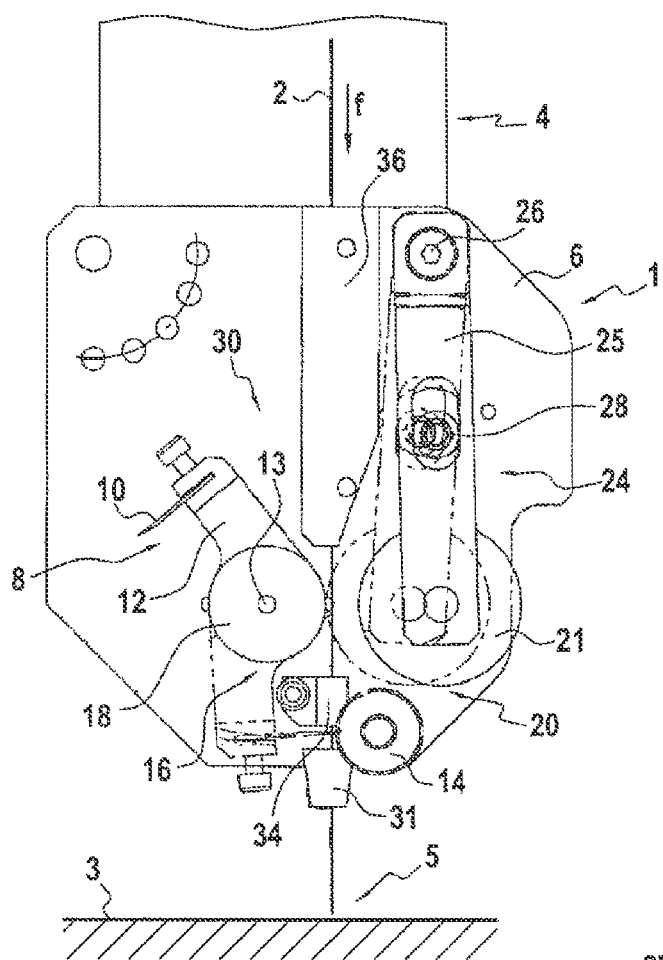
FIG. 1 is a front view of a first implementation example of an applicator head according to the invention.
Figure 2:
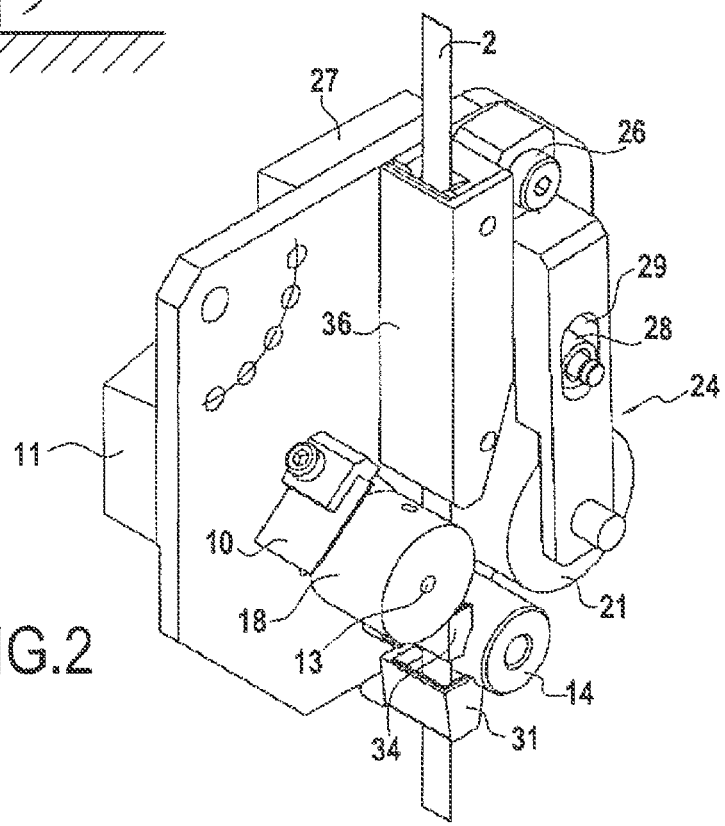
FIG. 2 is a partial perspective view of the applicator head illustrated in FIG. 1.

As can be seen more clearly in FIGS. 1 to 5, the object of the invention concerns a head 1 to assure the placement, deposit or application of reinforcement yarns 2 on an application or deposit surface 3 in a general sense, so as to create a composite material part. This applicator head 1 is part of an application machine 4, which generally comprises a motion device consisting of a robot equipped with a multiarticulated arm at whose extremity is mounted the applicator head 1. The applicator machine 4 is not described more precisely because it is well known to those skilled in the art and is not specifically part of the subject of the invention.

The applicator head 1 is designed to place reinforcement yarns 2 of any kind and composition, presented for example in the form of yarns, yarn braids, yarn strands, fibers, etc. and composed of different constituent materials, such as carbon, glass, polyester, aramid, etc., these reinforcement yarns being preimpregnated or not with a binder. The applicator head 1 according to the invention allows the placement of one or more reinforcement yarns 2 distributed in one or more layers deposited simultaneously. In the example shown in FIG. 1 to 5, the applicator head 1 ensures the placement of one reinforcement yarn while in the example shown in FIG. 6, the applicator head allows the simultaneous application of six reinforcement yarns.

The applicator head 1 ensures the placement of the reinforcement yarns 2 in an application zone 5 of the deposition surface 3 by the relative motion between the applicator head 1 and the deposition surface 3, and in general the motion of the applicator head 1 relative to the deposition surface 3. The reinforcement yarns 2 are fed from a known and not shown storage device and are unwound by any appropriate means in the displacement direction f shown in FIG. 1.

The applicator head 1 comprises a support structure 6 for a cutting mechanism 8 of reinforcement yarns 2. In the variant illustrated in FIGS. 1 to 5 the mechanism 8 is designed to cut a single reinforcement yarn 2, while in the variant illustrated in FIG. 6, the mechanism 8 is designed to provide simultaneous cutting of a series of reinforcing yarns 2 forming a layer of six reinforcement yarns in the example shown. The cutting mechanism 8 is of course located upstream of the application zone 5 given the unwinding direction f of the reinforcement yarns.

The cutting mechanism 8 comprises at least one cutting unit 10 and a drive motor 11 for moving the cutter 10 at first in a forward stroke to cut the reinforcing yarns 2, and then in a return stroke in the opposite direction to release the cutter 10 from the reinforcement yarns 2.

In the embodiment example illustrated, the cutter 10 is mounted mobile to rotate along a circular path. The cutter unit 10 like a cutting blade is preferably mounted in an interchangeable manner by any known means to the end of an arm 12 connected to a rotating shaft 13 driven by the motor unit 11. Advantageously, the motor 11 is implemented by a rotary device such as a pneumatic rotary actuator.

In a characteristic preferred embodiment, the cutting mechanism 8 also includes an anvil 14 on which the cutter 10 lands to cut the reinforcement yarns 2. In the example shown, the anvil 14 is formed by a roller mounted on the supporting structure 6, such that the position of the reinforcing yarn 2 is substantially tangent to the anvil roll. Of course, the anvil roll 14 and the cutter 10 extend on both sides of the reinforcement yarn 2.

Figure 5:
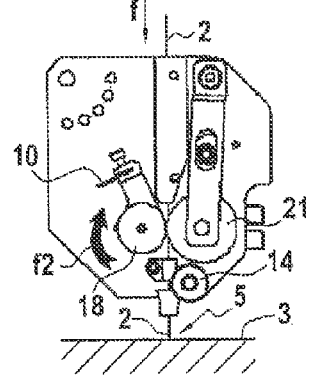

The motor unit 11 drives and rotates the cutting unit 10 first in a forward stroke in the direction of rotation shown by arrow f1 between a rest position (FIG. 1) and a cutting position (FIG. 3), and then in a return stroke in the direction of rotation illustrated by arrow f2, contrary to the direction of rotation f1, between the cutting position (FIG. 3) and the rest position (FIG. 5). Note that the cutter 10 is mounted so that in the cutting position or while touching the anvil roll 14, the cutter 10 is substantially perpendicular to the direction of movement of the reinforcement yarns 2. The cutting unit 10 therefore has a reciprocating circular notion in an angular range of less than 180°, for instance of the order of 150°. The reciprocating motion of the cutter 10 is thus limited between its two extreme positions, namely the cutting position and the position of rest or release of the cutter from the reinforcement yarns.

According to the invention, the motor unit 11 of the cutter 10 also drives the motion of a redirection system 16 of the reinforcing yarn 2. In other words, the cutting mechanism 8 drives the redirection system 16 to ensure the feed of the reinforcement yarn 2, after it is cut by the cutter 10, at least up to the application zone 5. This redirection system 16 is designed to, first, not feed the reinforcement yarns 2 during the forward stroke of the cutter 10, and secondly, to feed the reinforcement yarns 2 at least up to the application zone 5 during the return stroke of the cutter 10. Thus, the redirection system 16 includes means for feeding reinforcement yarns 2 at least up to the application zone 5 during the return stroke of the cutter 10 and means that do not feed the reinforcement yarns 2 during the forward stroke of the cutter 10. In the embodiment illustrated in the drawings, the redirection system 16 includes at least one drum 18 rotated by the motor unit 11. In the example illustrated, the driving drum 18 is mounted on the shaft 13 and is attached to the latter to be rotated by the motor unit 11.

In a preferred characteristic embodiment, the redirection system 16 also includes a clamping mechanism 20 of the reinforcement yarns 2 to maintain them in position. Advantageously, this clamping mechanism 20 clamps the reinforcement yarns 2 against the drum 18. In the embodiment example illustrated, the clamping mechanism 20 includes a counter-drum 21 mounted opposite the drum 18 so that the drum 18 and the counter-drum 21 are located on either side of the reinforcement yarns 2. The motion of the counter-drum 21 is controlled with respect to the drum 18 using a separation/recon acting system 24 so as to move the counter-drum 21 either separated before the drum 18 rotates along its forward stroke f1 to free the reinforcement yarns 2, or recontacted before the drum 18 rotates along its return stroke f2 to ensure the feed of the reinforcement yarns 2 by friction with the drum 18.

According to the illustrated embodiment, the separation/recontacting system 24 includes a lever 25 pivoted at one of its ends end on a pivot pin 26. The opposite end of the lever 25 is equipped with the counter-drum 21. The separation/recontacting system 24 also includes a motor unit 27 to move the lever 25 so as to bring the counter-drum 21 either to its separation position relative to the drum 18, allowing free passage for the reinforcement yarns 2 (FIG. 3), or to its clamped position in which the reinforcement yarns 2 are clamped or secured between the counter-drum 21 and the drum 18 (FIG. 4). According to an advantageous embodiment, the motor 27 is a rotary unit such as a pneumatic rotary actuator activating a cam 28 on the lever 25. As is clear from FIGS. 1 and 2, the cam 28 which is rotated by the motor 27 is mounted inside an aperture 29 created in the lever 25 between the pivot pin 26 and the counter-drum 21.

Of course, the drum 18 and the counter-drum 21 are located upstream of the anvil 14, with respect to the direction of motion f of the reinforcement yarns 2.

The operation of the applicator head 1 follows the description above.

Figure 3:
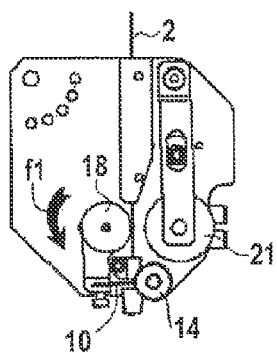
FIGS. 3 to 5 show the applicator head illustrated in FIGS. 1 and 2 in various characteristic operating positions.
Figure 4:
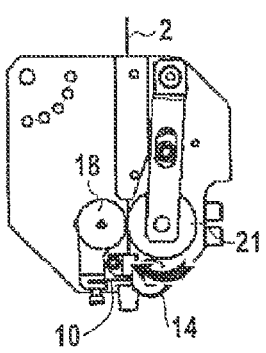

When the reinforcement fiber 2 needs to be cut, the motor 11 is activated to pivot the cutter 10 along the arrow f1 so as to bring the cutter 10 against the anvil 14 (FIG. 3). The reinforcement yarns 2 are thus cut at the anvil 14. The motor unit 27 of the separation/recontacting system 24 is activated to recontact the counter-drum 21 to drum 18 in order to clamp the reinforcement yarn 2 between the drum 18 and the counter-drum 21. When this clamping position of the reinforcement yarn 2 is reached (FIG. 4), the motor 11 is activated to move the cutter 10 on its return stroke along the arrow f2 (FIG. 5). During the rotation of the cutter 10 along its return stroke, the drum 18 is also driven to rotate in the direction of the arrow f2, thus feeding the reinforcement yarn along its direction of movement shown by the arrow f, by pinching or clamping the reinforcement yarn between the drum 18 and the counter-drum 21. In other words, the rotation of the drum 18 along the arrow f2 feeds the reinforcement yarn 2 up to at least the application zone 5. Of course, the direction of rotation of the drum 18 is selected to redirect the reinforcement yarn to the application zone 5. Moreover, the linear stroke to reload the reinforcement yarn between its cutting position and the application zone 5 depends on the angular travel of the drum 18. In the example, the rotation motion (forward or return) of the drum 18 is less than 180° and for example of the order of 150°.

The motor unit 27 can then be activated to separate the counter-drum 21 from the drum 18 in order to assure a free passage of the reinforcement yarns and theft application on the deposition surface 3 (FIG. 1). Note that while the counter-drum 21 is in its recontacted position in which the reinforcement yarns are clamped, the applicator head 1 can be moved without risking an unintended movement of the reinforcement yarns. Consequently, because the reloading path of the reinforcement yarns 2 is known without any modification due to the clamping of the reinforcement yarns, the reinforcement yarns 2 can be applied in a specific zone of the deposition surface 3.

In the above description, the type of motor 11 is rotary. Of course, a linear drive unit can be implemented, activating the drum 18 through a motion translation system or through a cam-type reloading system for example. Similarly, it is possible to implement the feed drum 18 without the counter-drum 21. According to this embodiment, the drum 18 is designed to not feed the reinforcement yarns 2 during the forward stroke of the cutter 10 but to feed the reinforcement yarns during the return stroke of the cutter unit 10. For example, the drum 18 may have a coating designed to directly provide this feed function, or to act indirectly on the reinforcement yarns using a unidirectional feed mechanism for the reinforcement yarns. It is possible to implement as a redirection system 16, a mechanism comprising a gear acting on a rack in contact with the reinforcement yarn only during the forward redirection path, for example in contact with the counter-drum 21.

It appears from the above description that a joint motor for the cutter 8 and the redirection system 16 provides a gain in terms of bulk and cost. Furthermore, the implementation of a clamping mechanism 20 which maintains the reinforcement yarns 2 in position and contributes to the redirection of reinforcement yarns, also enables the creation of a compact applicator head.

Figure 6:
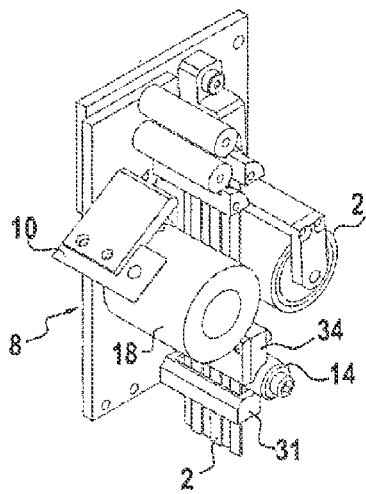
FIG. 6 illustrates another embodiment of an applicator head according to the invention, adapted for the simultaneous placement of several reinforcing yarns.

According to an advantageous embodiment, the applicator head 1 comprises a guiding device 30 of the reinforcement yarns 2 to the application zone 5. In a preferred characteristic embodiment, the guidance system 30 of the reinforcement yarns comprises, between the cutter 8 and the application zone 5, a truncated cone 31 to guide the reinforcement yarns 2 that widens from the application zone 5 in the direction of the cutting mechanism 8. As can be seen more clearly in FIGS. 1 and 2, the truncated cone 31 is located downstream of the roller anvil 14 with respect to the moving direction f of the reinforcement yarns. The truncated cone conduit 31 thus has a cross-section that decreases in the direction of motion f to substantially reach at the exit of the truncated cone 31 a cross-section corresponding to the gauge or width of the reinforcement yarn 2 (FIGS. 1 to 5) or of the set of reinforcement yarns (FIG. 6). The entrance cross-section of the truncated cone 31, which is thus larger than the gauge of the reinforcement yarn (FIGS. 1 to 5) or of the reinforcement yarns (FIG. 6) facilitates the capture of the reinforcement yarns during their redirection.

According to a preferred embodiment, the guiding device 30 of the reinforcement yarns 2 also includes a guide 34 located between the cutter 8 and the feed drum 18. This guide 34 is thus interposed between the anvil roll 14 and the feed drum 18. This guide 34 defines at least one guide channel with a width substantially equal to the gauge of a reinforcement yarn 2 (FIGS. 1 to 5) or a series of individual guide paths for each reinforcement yarn 2, distributed for example into two sub-layers (FIG. 6).

According to another preferred embodiment, the guiding device 30 of the reinforcement yarns also has upstream of the feed drive 18, a guide block 36 that provides an individual guide path for each reinforcement yarn 2.

Figure 7:
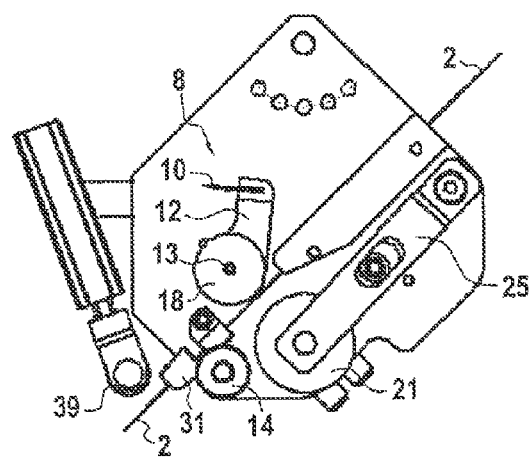
FIG. 7 illustrates another embodiment of an applicator head according to the invention, using an applicator roller.

In the above description, the placement of the reinforcing yarns 2 on the deposition surface 3 is achieved without contact by the applicator head 1. Of course, as shown in FIG. 7, the applicator head 1 according to the invention can be equipped with an applicator unit 39, such as a roller or a free-rotation roller mounted on the supporting structure 6, extending into the application zone 5. This applicator head 1 thus ensures the placement of the reinforcement yarns 2 with a continuous contact on the deposition surface 3.

The invention is not limited to the examples described and shown because various modifications can be made without departing from its scope.

The invention claimed is:

1. An applicator head for cutting yarn into segments of yarn and depositing said segments of yarn on a deposition surface, said applicator head comprising a mechanism that moves said yarn towards said deposition surface and also cuts said yarn into said segments, said mechanism comprising:

a cutting element for cutting said reinforcement yarn into said segments;

a drive component comprising an arm portion connected to said cutting element for moving said cutting element in a first direction towards contact with said yarn at a cutting location and for moving said cutting element in a second direction away from said cutting location, said drive component further comprising a drive surface for engagement with said yarn to move said yarn towards said cutting location, wherein said arm portion is connected to said drive surface such that said drive surface moves in the same direction as said cutting element when said cutting element is moved in said first direction or said second direction; and a yarn contact system for providing engagement of said drive surface with said yarn to move said yarn towards said cutting location when said cutting element is moving in said second direction and to disengage said yarn from said drive surface when cutting element is moving in said first direction.

2. An applicator head according to claim 1 wherein said drive component comprises a drive cylinder that comprises a drive axis and a cylindrical drive surface for engaging said yarn, wherein said arm portion is connected to said drive cylinder such that said drive surface and said arm rotate about said drive axis.

3. An applicator head according to claim 1 wherein said yarn contact system comprises a yarn contact surface and a control device for moving said yarn contact surface towards said drive surface to engage said yarn with said drive surface when said cutting element is moving in said second direction and for moving said yarn contact surface away from said drive surface to disengage said yarn from said drive surface when said cutting element is moving in said second direction.

4. An applicator head according to claim 3 wherein said yarn contact system comprises a contact cylinder that comprises a rotation axis and a cylindrical yarn contact surface wherein said yarn contact surface rotates about said rotation axis.

5. An Applicator head according to claim 4 wherein said drive component comprises a drive cylinder that comprises a drive axis and a cylindrical drive surface for engaging said yarn, wherein said arm portion is connected to said drive cylinder such that said drive surface and said arm rotate about said drive axis.

6. An applicator head according to claim 1 which further comprises an applicator unit comprising an applicator surface for pressing said segments of yarn onto said deposition surface.

7. An applicator head according to claim 1 wherein said yarn comprises multiple strands of yarn.

8. A method for cutting yarn into segments of yarn and depositing said segments of yarn on a deposition surface, said method comprising the steps of:

providing a cutting element for cutting said reinforcement yarn into a segment of yarn at a cutting location;

providing a drive component comprising an arm portion connected to said cutting element, said drive component further comprising a drive surface for engaging said yarn to move said yarn towards said cutting location moving said cutting element in a first direction towards contact with said yarn at said cutting location;

disengaging said yarn from said drive surface when said cutting element is moving in said first direction;

cutting said yarn at said cutting location to form said segments of yarn;

moving said cutting element in a second direction away from said cutting location;

engaging said yarn with said drive surface to move said yarn towards said cutting location when said cutting element is moving in said second direction; and depositing said segment of yarn on said deposition surface.

9. A method according to claim 8 wherein said drive component comprises a drive cylinder that comprises a drive axis and a cylindrical drive surface for engaging said yarn, wherein said arm portion is connected to said drive cylinder such that said drive surface and said arm rotate about said drive axis.

10. A method according to claim 8 wherein said steps of engaging and disengaging said yarn from said drive surface is accomplished using a yarn contact system that comprises a yarn contact surface and a control device for moving said yarn contact surface towards said drive surface to engage said yarn with said drive surface when said cutting element is moving in said second direction and for moving said yarn contact surface away from said drive surface to disengage said yarn from said drive surface when said cutting element is moving in said second direction.

11. A method according to claim 10 wherein said yarn contact system comprises a contact cylinder that comprises a rotation axis and a cylindrical yarn contact surface wherein said yarn contact surface rotates about said rotation axis.

12. A method according to claim 11 wherein said drive component comprises a drive cylinder that comprises a drive axis and a cylindrical drive surface for engaging said yarn, wherein said arm portion is connected to said drive cylinder such that said drive surface and said arm rotate about said drive axis.

13. A method according to claim 8 wherein an applicator unit that comprises an applicator surface is used to deposit said segments of yarn onto said deposition surface.

14. A method according to claim 8 wherein said yarn comprises multiple strands of yarn.

* * * * *